United States Patent Office 3,677,768
Patented July 18, 1972

3,677,768
PROCESS FOR PRODUCING AN INSTANT CEREAL
Stanley Martin Mokrzycki, Avenel, Edwin Leon Sexton, Middletown, Thomas George Powers, Bayonne, and Daniel Melnick, West Englewood, N.J., assignors to CPC International Inc.
No Drawing. Filed Aug. 19, 1969, Ser. No. 851,441
Int. Cl. A23l 1/10
U.S. Cl. 99—83                                13 Claims

ABSTRACT OF THE DISCLOSURE

A process for producing an instant cereal product by moistening cereal granules, tempering the moistened granules, partially pregelatinizing and drying them, and recovering an instant cereal product. The instant cereal produced in this manner hydrates substantially instantaneously.

---

This invention reveals an instant cereal product and a process for producing it.

Regular farina when received in a processing plant is in granular form and contains about 13% moisture. Sterilization of the granules is accomplished by heating them to about 170° F. for about 4 minutes. After the sterilization procedure the farina granules are cooled, passed over a screen to obtain the proper size granulation and sent to a filling operation.

Preparation of the regular farina for eating purposes requires mixing with water and cooking for about 3 minutes in a saucepan over a heating medium.

Regular corn meal (grits) when received in a processing plant is also in granular form and contains about 13% moisture. The corn granules are sterilized in the same manner as farina granules. Regular corn meal must be cooked for several minutes to prepare an edible cereal.

A process of treating cereal whereby the resulting treated cereal product did not require cooking would be desirable. This would provide an instant cereal product that would be quicker and more convenient for the housewife to prepare.

In view of the above, it becomes an object of this invention to provide a method for preparing an instant cereal product.

Another object of the invention is to provide an improved cereal product that will hydrate and gelatinize in an aqueous liquid.

A further object of the invention is to provide an improved sweet cereal product which contains sugar and which hydrates instantly in an aqueous liquid.

Yet another object of the invention is to provide a method for making the instant sweet cereal product described above.

A still further object of the invention is to provide a method for making the improved sweet cereal product described above.

Other objects will appear hereinafter from the description that follows and from the appended claims.

GENERAL DESCRIPTION OF THE INVENTION

The process described herein for producing an instant cereal product comprises moistening cereal granules, tempering, partially pregelatinizing, and drying them to form a cereal that hydrates rapidly.

The term "instant," as used herein to describe cereal products, means that the products hydrate in aqueous solutions at a temperature of 175° F.–212° F. without cooking and in a relatively short period of time, generally less than about 90 seconds.

The method of the invention is applicable to mixtures of different cereals or mixtures of cereals with other raw flours, meals, and starches as well as to individual cereals themselves. Preferably, the mixture consists predominantly of cereal granules. The remainder of the mixture can comprise any raw flours, meals, and starches, such as for example, oat meal, rice flour, corn starch, and the like. The preferred cereals are farina and corn (hominy) grits.

When the term "farina" is used herein what is meant is the commercially available clean sound granular wheat flour commonly referred to by this term. It ordinarily has a moisture content of from about 12.5% to about 13.5%, generally 12.7% or 12.8% by weight, and generally has a specific gravity of about 0.65 to about 0.75.

When the terms "corn meal," "corn grits," and "hominy grits" are used herein what is meant is the commercially available clean sound granular corn flour commonly referred to by these terms. It ordinarily has a moisture content of from about 9.5% to about 13%, generally 10.4% to 10.8% by weight.

The aqueous liquid generally employed in the procedure, for moistening the cereal granules, is water. Preferably from about 1% to about 17% by weight of water based on the cereal is applied to the cereal as by spraying, to moisten it. Most preferably, the amount of water applied to moisten the cereal falls within the range from about 4% to about 9% by weight of the cereal. The water used may contain dissolved salt, antioxidants, coloring materials, flavoring materials, nutrients such as vitamins and minerals, and the like.

The moistened granules are next tempered. Tempering comprises holding the cereal granules for a sufficient time for them to soften as they absorb a portion of the moisture. Preferably, the granules are held, to permit equilibration to occur, for a time falling within the range from about 15 minutes to about 90 minutes, and more preferably, from about 30 minutes to about 75 minutes. The tempering may be continued for much longer times so long as mold formation does not occur. For example, we have continued the tempering process for as long as 2 days. The tempering is preferably carried out at ambient indoor temperature although any temperature below the gelatinization temperature of the cereal (about 170° F.) may be employed.

After the cereal granules have been tempered as described above they are preferably disrupted to form disrupted granules. The disruption step is not essential. It serves to reduce graininess in the final product.

The disrupting may be accomplished by any convenient technique. A particularly advantageous technique comprises compressing the softened cereal granules, for example by expressing them between pressure bearing members such as rollers. It is preferable to produce compressed granules of a thickness falling within the range from about 0.14 mm. to about 0.35 mm. Most preferably, compressed granules are produced of a thickness from about 0.16 mm. to about 0.32 mm. This is true whether the granules are farina or corn. The compressed granules hydrate rapidly on contact with boiling water.

Other techniques may also be used to disrupt the granules. For example, the granules may be disrupted by freeze drying, drying under vacuum, flash heating, application of ultrasonic energy, or the like. Due to ease of operation the compression technique is preferred.

The disrupted granules produced by compressing preferably are partially pregelatinized and simultaneously dehydrated to a total moisture content falling within the range from about 1% to about 15% by weight, by heating them. This assures that they will hydrate rapidly in water that is at a temperature that is not necessarily as high as the boiling point, although generally best results are obtained if the water temperature is above about 175° F. The stated weight percentages are based upon the total weight. Most preferably, the total moisture content of the pregelatinized, dehydrated product falls within the range from about 2% to about 7% by weight.

Partial pregelatinizing and dehydrating of the disrupted granules produced by compressing is preferably carried out by heating at a temperature falling within the range from about 160° F. to about 450° F. for from about 3 minutes to about 90 minutes. Most preferably, the partial pregelatinizing and dehydrating is carried out at a temperature falling within the range from about 200° F. to about 300° F. for from about 10 minutes to about 75 minutes.

Partial pregelatinization and dehydration of disrupted farina granules produced by compressing increases their thickness to preferably fall within the range from about 0.20 mm. to about 0.42 mm. and more preferably from about 0.27 mm. to about 0.38 mm. The same treatment of disrupted corn grits increases their thickness to preferably fall within the range from about 0.40 mm. to about 0.75 mm. and more preferably from about 0.60 mm. to about 0.70 mm.

When a disrupting step is not used on farina granules, the product will usually have a thickness of from about 0.55 mm. to about 0.75 mm. When a disrupting step is not used on corn grits, the product will usually have a thickness of from about 0.85 mm. to about 1.05 mm. All of the above thicknesses are determined at least in part, by the thickness of the granules before treatment and may therefore fall outside of the indicated "usual" ranges.

The partially pregelatinized and dehydrated disrupted granules are allowed to cool, and the resulting instant cereal product is recovered.

An instant farina product, produced as described above, hydrates substantially instantly when contacted with an aqueous liquid. Preferably, the liquid is at a temperature above about 175° F. The aqueous liquid may be water, milk, including skim milk, synthetic milk, or the like. The product will have a tendency to form lumps. The lumps are difficult to break up into discrete particles by stirring and during eating. The product is very suitable for making dumplings.

The addition of sugar to the dry instant farina product will essentially eliminate the tendency to lump. The product will hydrate without lumping if sugar is mixed with the dry product prior to the addition of water. A product with a degree of agglomeration characteristic of regular cooked farina is obtained. The sugar may be used in quantities large enough to provide desirable sweetness or alternatively in low enough quantities so as not to be noticeable.

The amount of sugar used preferably provides a sugar content in the product which falls within the range from about 1% to about 40% by weight based on the total weight of the product. Most preferably, for desirable sweetness, the sugar content is from about 20% to about 30% by weight.

Sugar, salt, and the like may be added to the instant corn product to improve its taste.

The addition of regular untreated farina granules to the instant farina product will also eliminate the tendency to lump. The amount of regular farina granules used preferably provides a regular farina granule content in the product of from about 1% to about 30% by weight based on total product weight. The combined use of sugar and regular farina is also effective in eliminating lumping. The added untreated farina granules give a pleasingly coarse texture to the final product. The texture is reminiscent of that of conventionally cooked regular farina.

Instant farina products which do not have a tendency to lump are suitable for use as hot breakfast cereals.

An instant corn product, produced as described above, hydrates substantially instantly when contacted with an aqueous liquid. Preferably the liquid is at a temperature of above about 175° F. The same liquids may be used as with the instant farina. The product is of good consistency and mouth feel for an edible cereal.

Flavoring materials such as dried fruits, dried egg, glutamate, spices, and the like, nutrients, such as vitamins and minerals, coloring materials, baking powder, other instantized grains, and antioxidants such as butylated hydroxy anisole may also be added to the products.

These additional ingredients can be mixed with the granules prior to their being instantized by the method of the invention or they may be blended with the instantized cereal granules.

The product of this invention can be packaged in the usual manner in which cereal products are packaged. For example, large packages can be made which servings can be measured with a household measuring device. Alternatively, individual serving cereal packets can be prepared.

Farina product

The instant farina product produced in accordance with this invention comprises presoftened and partially pregelatinized farina granules containing from about 1% to about 15% moisture. The product may also contain from about 1% to about 40% sugar and/or from about 1% to about 20% regular farina, the percentage figures being weight percent based on the total product weight.

The instant farina product when made by the preferred compressing procedure and partially pregelatinized is further characterized in that it has a specific gravity of from about 0.50 to about 0.63, and in that the granules, that have been processed in accordance with this invention, have thicknesses generally in the range from about 0.20 mm. to about 0.42 mm., and have a specific gravity about 40% less than regular granules. The partially pregelatinized granules preferably have a thickness of from about 0.27 mm. to about 0.38 mm.

The specific gravity is measured by flowing the product into a tared cup of known volume until the cup is full and weighing the full cup. The specific gravity is defined as the weight of the product in grams divided by the volume of the cup in cubic centimeters.

The instant farina product is further characterized in that it will form an edible cereal product upon addition of an aqueous liquid at temperatures above about 175° F.

For improved flavor, the instant farina product will preferably contain from about 0.5% to about 2% by weight of salt, the weight percentages being based on total product weight.

Corn product

The instant corn product of the invention comprises presoftened and partially pregelatinized corn granules containing from about 1% to about 15% moisture. The product may also contain from about 1% to about 40% sugar, and, as well, additional flavoring and preserving agents.

The instant corn product, when made by the preferred compressing procedure, and partially pregelatinized is further characterized in that it has a granule thickness in the range from about 0.40 mm. to about 0.75 mm. The preferred granule thickness is from about 0.60 mm. to about 0.70 mm.

The instant corn product is further characterized in that it will form an edible cereal product upon addition of an aqueous liquid at temperatures above about 175° F.

For improved flavor, the instant corn product will preferably contain about 0.5% to about 2% by weight of salt, the weight percentages being based on total product weight.

An edible cereal may be instantly prepared from the instant cereal product produced in accordance with this invention. The preparation of an edible cereal product comprises adding aqueous liquid to the instant cereal product produced as described above. The aqueous liquid may be water, milk, synthetic milk, or the like. To prepare an edible cereal, preferably from about 4 grams to about 6 grams of liquid are blended with each 1 gram of the improved instant cereal product.

The following examples will illustrate processes for preparing improved instant cereal products and edible cereals by the method of this invention. The examples are meant to be illustrative only, and the invention, of course, is not to be limited thereto. All percentage figures are weight percent based on total substance unless otherwise specified.

EXAMPLE I

Production of improved instant farina

A sample of farina granules containing about 13.3% moisture by weight, was sprayed with water. About 7% spray water was used based on the farina weight. The granules were softened by allowing the moist granules to temper for about 30 minutes, after which the observed moisture content was about 20.7%.

The softened granules were passed between rollers. The rollers disrupted the granules by compressing them. The farina issued from the rollers as slightly compressed granules. The thickness of the granules was about 0.19 mm.

The granules were then heated for about 4 minutes in a sterilizer, to a temperature in the range from about 268° F. to about 276° F. They were held in this temperature range for about 30 minutes in storage drums. This procedure partially pregelatinized and dried the granules. The moisture content of the product at the conclusion of the heating operation was about 2.2%. The resulting farina product was then cooled to room temperature, by pouring it from the storage drums through a cool air stream. The cooled product was collected and stored. Granule thickness had recovered to about 0.32 mm. The granules appeared to be fissured.

About 30 grams of the farina product produced as just described were mixed with about 2 ounces of hot water at a temperature of about 175° F. The farina hydrated quickly (within about 30 seconds) but some lumping of the particles occurred. The hydrated product was shaped into dumplings. After cooking, the dumplings were of a pleasing taste and consistency.

A presweetened instant farina product was formulated by mixing about 30 grams of the instant farina product produced as described above with about 11 grams of sugar and about 0.8 gram of salt. An edible cereal was made from the presweetened farina product by adding about 4 ounces of hot water at a temperature of about 175° F. to the presweetened instant farina product. The presweetened instant farina product hydrated readily in the hot water (within about 1 minute). Lumping did not occur. The resulting edible cereal was pleasant tasting.

EXAMPLE II

Production of improved instant corn grits

A sample of corn granules (grits) containing about 10.6% moisture by weight, was sprayed with water. About 15% spray water was used based on the corn weight. The granules were softened by allowing the moist granules to temper for about 60 minutes, after which the observed moisture content was about 21.3%.

The softened granules were passed between rollers to disrupt them. The corn issued from the rollers as compressed granules. The thickness of the granules was about 0.24 mm.

The granules were then heated for about 4 minutes in a sterilizer, to a temperature of 274° F. to 287° F. They were held at a temperature of 262° F. to 272° F. for about 60 minutes in storage drums. This procedure partially pregelatinized and dried the granules. The moisture content of the product at the conclusion of the heating operation was about 2.1%. The resulting corn product was cooled to room temperature. Granule thickness had recovered to about 0.63 mm. The granules appeared to be fissured.

About 29 grams of the corn product were mixed with about 4 ounces of hot water at a temperature of 175° F. The corn granules hydrated quickly (within about 30 seconds). An edible cereal of excellent consistency, flavor, and mouth feel was formed.

EXAMPLE III

Production of improved instant farina from non-disrupted farina

A sample of farina granules containing 13.4% moisture was sprayed with water. About 7% spray water was used based on the farina weight. The granules were softened by allowing them to temper for about 60 minutes, after which the observed moisture content was about 20.7%.

The granules were heated for about 4 minutes in a sterilizer to a temperature of 274° F. to 287° F. They were held at a temperature of 262° F. to 272° F. for about 60 minutes in storage drums. This procedure partially pregelatinized and dried the granules. The moisture content of the product at the conclusion of the heating operation was about 4.6%. The resulting farina product was cooled to room temperature. Granule thickness of the product was about 0.65 mm.

About 29 grams of the farina product were mixed with about 4 ounces of hot water at a temperature of 175° F. The farina granules hydrated within about 30 seconds. An edible cereal of somewhat granular consistency and mouth feel but of excellent flavor was formed.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

That which is claimed is:

1. A process for producing an instant cereal product which comprises:
   moistening cereal granules selected from the group consisting of wheat farina and corn grits with from about 1% to about 17% by weight of water to form a tempering mixture, the weight percents being based on total weight of the moistened material;
   tempering the moistened granules by holding the granules until softened;
   heating the granules to a temperature of from about 160° F. to 450° F. to simultaneously partially pregelatinize and dehydrate the granules to a moisture content of from about 1% to about 15% by weight water, the weight percents being based on total composition weight;
   and recovering a cereal product that hydrates substantially instantaneously.

2. The process as in claim 1 wherein the granules are corn grits.

3. The process as in claim 1 including admixing sugar with the partially pregelatinized and dehydrated wheat farina granules to provide a sugar content in the product of from about 1% to about 40% by weight based on the total weight of the product.

4. The process as in claim 1 wherein the granules are farina granules and including admixing from about 1% to about 30% of regular farina with the partially pregelatinized and dehydrated disrupted granules to eliminate lumping when the instant farina product is mixed with an aqueous liquid.

5. The process as in claim 1 including adding flavoring, nutrient, and antioxidant materials to the dried composition.

6. The process as in claim 1 including holding the moistened granules for tempering for from about 15 minutes to about 90 minutes, whereby the granules are softened.

7. The process as in claim 6 wherein the partial pregelatinizing and dehydrating is carried out at a temperature of from about 200° F. to about 300° F. for from about 10 minutes to about 75 minutes.

8. The process as in claim 7 including cooling the partially pregelatinized and dehydrated disrupted granules.

9. A process for producing an improved cereal product characterized in that the product hydrates substantially instantly when contacted with an aqueous liquid at a temperature of above about 175° F. which comprises:
(a) moistening cereal granules selected from the group consisting of wheat farina and corn grits with from about 1% to about 17% by weight of water to form a tempering mixture, the weight percents being based on total weight of the moistened material;
(b) tempering the moistened granules by holding them for about 15 minutes to about 90 minutes, whereby the granules are softened;
(c) compressing the softened granules;
(d) partially pregelatinizing and dehydrating the compressed granules until they have a moisture content of from about 1% to about 15% water based on total granule weight;
(e) recovering the improved cereal product.

10. The process as in claim 9 wherein the softened granules are compressed by passage between rollers to produce a compressed granule mixture wherein the compressed granules are of a thickness of from about 0.14 mm. to about 0.35 mm.

11. The process as in claim 10 wherein the cereal granules are wheat farina, the amount of water used to form the tempering mixture is from about 4% to about 9%, the granules are tempered for from about 30 minutes to about 75 minutes, the moisture content of the granules after partial pregelatinization and dehydration is from about 2% to about 7% and admixing the resulting improved cereal product with an amount of sugar, the amount of sugar being fro mabout 1% to about 40% by weight based on the weight of the mixture.

12. The process as in claim 11 wherein the partial pregelatinization and dehydrating is carried out at a temperature of from about 200° F. to about 300° F. for from about 10 minutes to about 75 minutes, and the amount of sugar is from 20% to 30% by weight based on the weight of the mixture.

13. The process as in claim 12 including adding flavoring, nutrient, and antioxidant material to the dried granules.

References Cited
UNITED STATES PATENTS

| | | | |
|---|---|---|---|
| 2,438,939 | 4/1948 | Ozai-Durrani | 99—80 PS |
| 3,494,769 | 2/1970 | Tressler | 99—83 |
| 2,930,697 | 3/1960 | Miller | 99—80 PS |
| 2,937,946 | 5/1960 | Ozai-Durrani | 99—80 PS |
| 2,890,117 | 6/1959 | Cantor | 99—83 |
| 3,526,512 | 9/1970 | Collins et al. | 99—83 |
| 3,526,513 | 9/1970 | Hyldon | 99—83 |
| 1,388,873 | 8/1921 | McKay | 99—80 |

RAYMOND N. JONES, Primary Examiner

U.S. Cl. X.R.

99—80